C. T. COATES.
TIRE.
APPLICATION FILED MAR. 18, 1911.

1,032,991. Patented July 16, 1912.

Witnesses:

Inventor
Clinton T. Coates
By Victor J. Evans,
Attorney.

UNITED STATES PATENT OFFICE.

CLINTON T. COATES, OF ST. LOUIS, MISSOURI.

TIRE.

1,032,991.         Specification of Letters Patent.         Patented July 16, 1912.

Application filed March 18, 1911. Serial No. 615,360.

*To all whom it may concern:*

Be it known that I, CLINTON T. COATES, a citizen of the United States, residing at St. Louis, in the State of Missouri, have invented new and useful Improvements in Tires, of which the following is a specification.

The invention relates to tires and more particularly to the class of metallic vehicle tires.

The primary object of the invention is the provision of a tire in which the body thereof is formed of a plurality of metallic sections each being detachably connected to a vehicle rim thus permitting the repairing of said tire should it become damaged or unfit for use.

Another object of the invention is the provision of a tire in which the requisite amount of resiliency is had and that will not become punctured, the tire being capable of standing heavy loads and which may be readily and conveniently attached to and detached from the vehicle wheel rim.

A further object of the invention is the provision of a tire in which the body thereof is constructed from a series of metallic tubiform sections interfitted with each other to present a contiguous tread surface and enabling the sections to be separated if desired without displacing the others when repairs are to be made.

With these and other objects in view, the invention consists in the construction, combination and arrangement of parts as will be hereinafter more fully described, illustrated in the accompanying drawings and pointed out in the claim hereunto appended.

Figure 1:
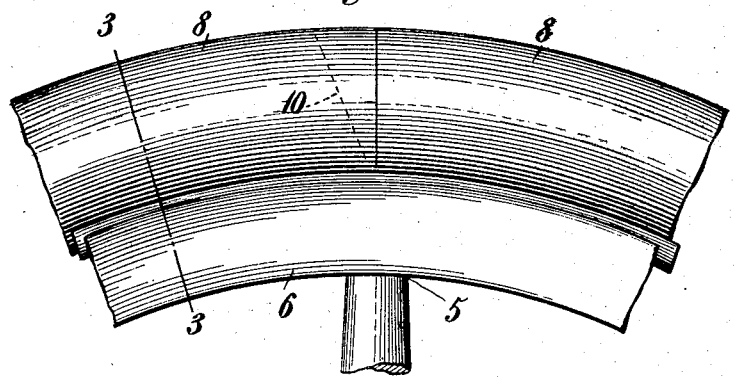
Figure 2:
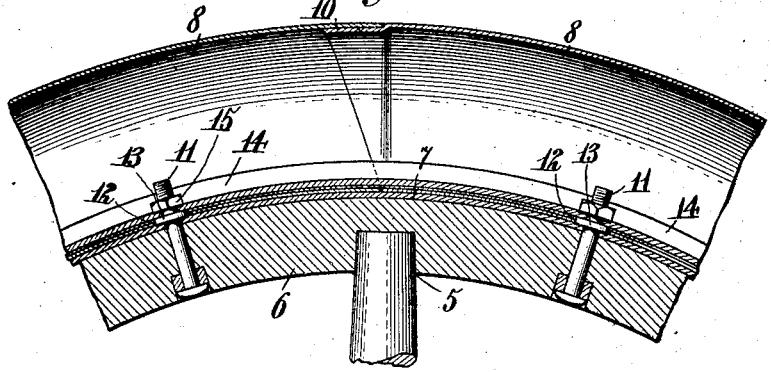
Figure 3:
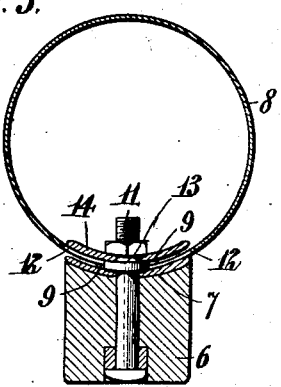
Figure 4:
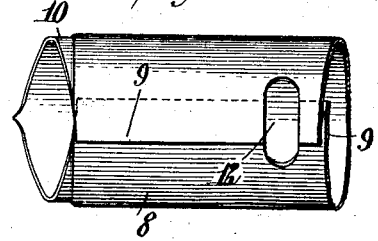

In the drawings, Figure 1 is a fragmentary side elevation of a vehicle wheel with the improved tire mounted thereon. Fig. 2 is a vertical longitudinal sectional view thereof. Fig. 3 is an enlarged sectional view on the line 3—3 of Fig. 1. Fig. 4 is a fragmentary plan view of one of the sections of the tire looking toward the inner rim engaging said tire.

Similar reference characters indicate corresponding parts throughout the several views of the drawings.

Referring to the drawings by numerals, 5 designates a portion of a vehicle wheel, which is of the ordinary well-known construction, and 6 its felly or rim, the same being channeled in the usual manner to provide a tire groove or seat 7 for receiving the inner or rim side of a tire, as will be hereinafter more fully described. This tire comprises a plurality of metallic tubular sections 8, each being split at its inner side to provide overlapped coextensive edges 9, the end edges of the sections being diagonally cut, and one end of each section is contracted to provide a reduced portion 10 adapted to telescope in the larger end of an adjacent section for the interfitting of the sections throughout the circumference of the wheel. Thus it will be seen that the sections, when jointed in this manner, will be flush at their tread surfaces, so as to present a smooth tread to the tire.

Fixed in the felly or rim 6 of the wheel and projecting outwardly therefrom at intervals are stationary threaded bolts 11, the same being suitably fixed in the rim or felly. The sections 8 are provided in their overlapped edges 9 with opposed alining transverse slots 12 opening through said edges 9 and receiving the bolts 11, the latter having loosely engaged therewith spacer washers 13 which play in said slots 12, so that the said sections may be expanded and contracted under the influence of a load or the irregularities in the ground surface during the travel of the wheel thereover.

Disposed within the sections and resting against the washers 13 is a concaved split holding ring 14, the same being held fast upon the bolts 11 by means of nuts 15 adjustably engaging said bolts 11, the said ring 14 being provided with suitable central apertures, through which the bolts 11 pass. Thus, by this rim 14, the tire will be held securely on the rim 6 of the wheel and against displacement thereof irrespective of lateral thrust of the wheel. Also the bolts 11 will prevent the creeping of the tire on the rim of the wheel while traveling upon the ground.

It is evident that the tire will be strong and possessed of the requisite resiliency, and will be puncture-proof, the tire being readily attachable to and detachable from the wheel rim at will. In fact, any one section 8 may be removed without disturbing the other sections of the wheel rim, should it be necessary to make repairs to the tire. The sections 8, as previously stated, are constructed from spring metal. Thus it will be obvious that the employment of air is obviated, as the sections will possess the requisite resiliency, thereby absorbing shocks and jars incident in the travel of the vehicle wheel.

What is claimed is:

The combination with a vehicle rim, of a tire comprising split tubular sections mounted upon said rim, each section being provided with transversely arranged alining slots opening through its split overlapping edges, bolt members passed through said rim and the slots in said sections, washers carried by said bolt members and engaging the edges of said slots for preventing longitudinal movement of the overlapping ends of said sections relative to said rim, said washers being of a thickness equal to the combined thickness of said overlapping edges, an inner rim arranged within said sections and disposed concentrically about the first named rim for engaging with said washers and the overlapping edges of said sections, and nuts threaded on the inner ends of said bolt members and engaging said inner rim.

In testimony whereof I affix my signature in presence of two witnesses.

CLINTON T. COATES.

Witnesses:
MARY MURPHY,
JOSEPHINE VON REPPERT.

Copies of this patent may be obtained for five cents each, by addressing the "Commissioner of Patents, Washington, D. C."